(12) United States Patent
Ye et al.

(10) Patent No.: US 6,476,961 B1
(45) Date of Patent: Nov. 5, 2002

(54) OPTICAL AMPLIFIER SYSTEMS WITH TRANSIENT CONTROL

(75) Inventors: Jun Ye, Palo Alto, CA (US); Yen-Wen Lu, Los Altos, CA (US); Yu Cao, Cupertino, CA (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 09/878,224

(22) Filed: Jun. 12, 2001

Related U.S. Application Data
(60) Provisional application No. 60/286,380, filed on Apr. 26, 2001.

(51) Int. Cl.[7] .................................................. H01S 3/00
(52) U.S. Cl. ................ 359/341.43; 359/337; 359/337.5
(58) Field of Search .............................. 359/337, 341.4, 359/341.41, 341.42, 341.43, 337.5, 337.4

(56) References Cited

U.S. PATENT DOCUMENTS

| | | | |
|---|---|---|---|
| 5,245,690 A | 9/1993 | Aida et al. | 385/142 |
| 5,513,029 A | 4/1996 | Roberts | 359/177 |
| 5,737,118 A * | 4/1998 | Sugaya et al. | 359/341 |
| 5,745,283 A | 4/1998 | Inagaki et al. | 359/341 |
| 5,812,710 A | 9/1998 | Sugaya | 385/27 |
| 5,900,969 A | 5/1999 | Srivastava et al. | 359/341 |
| 6,049,413 A * | 4/2000 | Taylor et al. | 359/337 |
| 6,061,171 A | 5/2000 | Taylor et al. | 359/341 |
| 6,094,298 A | 7/2000 | Luo et al. | 359/346 |
| 6,144,485 A | 11/2000 | Sugaya et al. | 359/337 |
| 6,163,399 A | 12/2000 | Berg | 359/341 |
| 6,166,850 A | 12/2000 | Roberts et al. | 359/341 |
| 6,198,572 B1 | 3/2001 | Sugaya et al. | 359/337 |
| 6,229,643 B1 * | 5/2001 | Nakamura | 359/341 |
| 6,236,499 B1 | 5/2001 | Berg et al. | 359/341 |

FOREIGN PATENT DOCUMENTS

| | | | |
|---|---|---|---|
| JP | 2000040847 | * | 2/2000 |
| WO | 97/28584 | | 8/1997 |
| WO | 00/41346 A1 | | 7/2000 |

OTHER PUBLICATIONS

Sun et al. "Optical Fiber Amplifiers for WDM Optical Networks" Bell Labs Journal, p. 187–206, Jan.–Mar., 1999.

Nortel Networks Datasheet "MGM Multiwavelength Gain Module" (Nov. 3, 2000).

Ono et al. "Automatic Gain Control in Silica–Based EDFA with over 50nm Flat Gain Bandwidth using an all Optical Feedback Loop" $10^{th}$ Optical Amplifiers and their Applications Technical Digest, p. 80–83, Jun. 9–11, 1999.

(List continued on next page.)

*Primary Examiner*—Mark Hellner
(74) *Attorney, Agent, or Firm*—Fish & Neave; G. Victor Treyz

(57) ABSTRACT

Optical amplifier equipment for operation in fiber-optic communications networks is provided. The optical amplifier equipment may include one or more gain, stages based on rare-earth-doped fiber or Raman-pumped fiber. The gain stages may be optically pumped using diode lasers. Optical monitors may be used to measure optical signals in the optical amplifier equipment. Input signals and output signals may be measured. A control unit may adjust the pump powers in the gain stages based on the measured optical signals to suppress gain transients. An optical delay line may be used to provide additional time for the control unit to process the optical signals before adjusting the pump powers. A midstage module including dispersion-compensating fiber may be installed in the optical amplifier equipment. The control unit may automatically detect the amount of optical delay associated with the installed module and may control the pump powers accordingly during transient control operations.

17 Claims, 13 Drawing Sheets

OTHER PUBLICATIONS

Kakui et al. "Dynamic–Gain–Tilt–Free Long–Wavelength Band Erbium Doped Fiber Amplifiers Utilizing Temperature Dependent Characteristics of Gain Spectrum" $25^{th}$ Optical Fiber Communication Conference, Technical Digest, p. 6–8, (Mar. 8, 2000).

Delavaque et al. "Gain Control in Erubium–Doped Fibre Amplifiers by Lasing at 1480nm With Photoinduced Bragg Gratings Written on Fibre Ends" Electronics Letters, vol. 29, No. 12, p. 1112–1114, Jun. 10, 1993.

Massicott et al. "1480nm Pumped Erbium Doped Fibre Amplifier with all Optical Automatic Gain" Electronics Letters, vol. 30, No. 12 p 962–964, Jun. 9, 1994.

Motoshima et al. "EDFA with Dynamic Gain Compensation for Multiwavelength Transmission Systems" OFC '94 Technical Digest, p. 191–192.

Zirngibl et al. "Gain Control in Erbium–Doped Fibre Amplifiers by an All Optical Feedback Loop" Electronics Letters, vol. 27. No. 7, p. 560–561, Mar. 28, 1991.

* cited by examiner

OPTICAL AMPLIFIER SYSTEMS WITH TRANSIENT CONTROL

This application claims the benefit of provisional patent application No. 60/286,380, filed Apr. 26, 2001.

BACKGROUND OF THE INVENTION

The present invention relates to fiber-optic communications networks, and more particularly, to optical amplifiers with transient control capabilities for use in optical communications networks.

Fiber-optic networks are used to support voice and data communications. In optical networks that use wavelength division multiplexing, multiple wavelengths of light are used to support multiple communications channels on a single fiber.

Optical amplifiers are used in fiber-optic networks to amplify optical signals. For example, optical amplifiers may be used to amplify optical data signals that have been subject to attenuation over fiber-optic links. A typical amplifier may include erbium-doped fiber coils that are pumped with diode lasers. Raman amplifiers have also been investigated. Discrete Raman amplifiers may use coils of dispersion-compensating fiber to provide Raman gain. Distributed Raman amplifiers provide gain in the transmission fiber spans that are used to carry optical data signals between network nodes.

Sometimes channels in a communications link may be abruptly added or dropped due to a network reconfiguration. Channels may sometimes be dropped due to accidental fiber cuts. When the number of channels carried by a link changes abruptly, the total signal power being transported over the link changes suddenly. This can adversely affect the performance of distributed or discrete amplifier equipment in the link.

For example, if an erbium-doped amplifier is pumped at a constant power, these sudden changes in signal power will result in transient effects in the gain of the amplifier. Gain transients in the amplifier may cause fluctuations in the power of the output signals at the output of the amplifier. Output signals that are too weak may be difficult to detect at a receiver. Output signals that are too strong may give rise to nonlinear optical effects.

Abrupt changes in the signal power on a link may also cause undesirable transient effects in the gain of other rare-earth-doped fiber amplifiers or Raman amplifiers.

It is an object of the present invention to provide optical amplifier systems with transient control capabilities for use in fiber-optic communications networks.

It is also an object of the present invention to provide optical amplifiers having optical delay lines.

It is also an object of the present invention to provide optical amplifiers that can measure optical delays associated with different installed midstage components and can use information on the measured delays in controlling gain transients.

SUMMARY OF THE INVENTION

These and other objects of the invention are accomplished in accordance with the present invention by providing optical amplifiers for communications networks such as those based on wavelength-division-multiplexing optical communications links that support multiple channels operating at different wavelengths. Optical amplifier equipment may be used to amplify optical signals on a communications link. Optical amplifiers may be based on distributed or discrete Raman amplifiers, rare-earth-doped fiber amplifiers such as erbium-doped fiber amplifiers, or any other suitable amplifiers.

The optical signals on the link may be monitored using optical monitors. Amplifiers may be provided in which input signals are monitored using input taps and output signals are monitored using output taps. Gain transients may be suppressed using feed-forward and feedback control techniques. Optical delay lines may be used to enhance the gain transient suppression capabilities of the amplifiers.

Optical amplifiers may be provided that have replaceable midstage modules. The midstage modules may, for example, be dispersion compensation modules based on coils of different lengths of dispersion-compensating fiber. The optical amplifiers may automatically detect the length of the dispersion-compensating fiber so that amount of optical delay associated with that fiber length may be taken into account when suppressing gain transients during operation of the amplifier.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
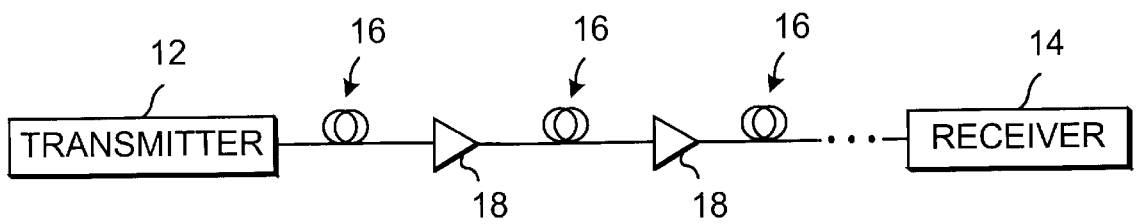
FIG. 1 is a schematic diagram of an illustrative fiber-optic communications link in accordance with the present invention.

An illustrative optical communications network link 10 in an optical communications network in accordance with the present invention is shown in FIG. 1. A transmitter 12 may transmit information to a receiver 14 over a series of fiber links. Each fiber link may include a span 16 of optical transmission fiber. Fiber spans may be on the order of 40–160 km in length for long-haul networks or may be any other suitable length for use in signal transmission in an optical communications network.

The communications link of FIG. 1 may be used to support wavelength division multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1520–1565 nm. These are merely illustrative system characteristics. If desired, more channels may be provided (e.g., hundreds of channels), signals may be modulated at slower or faster data rates (e.g., at approximately 2.5 Gbps for OC-48 or at approximately 40 Gbps for OC-768), and different carrier wavelengths may be supported (e.g., wavelengths in the range of 1240–1670 nm).

Figure 2:
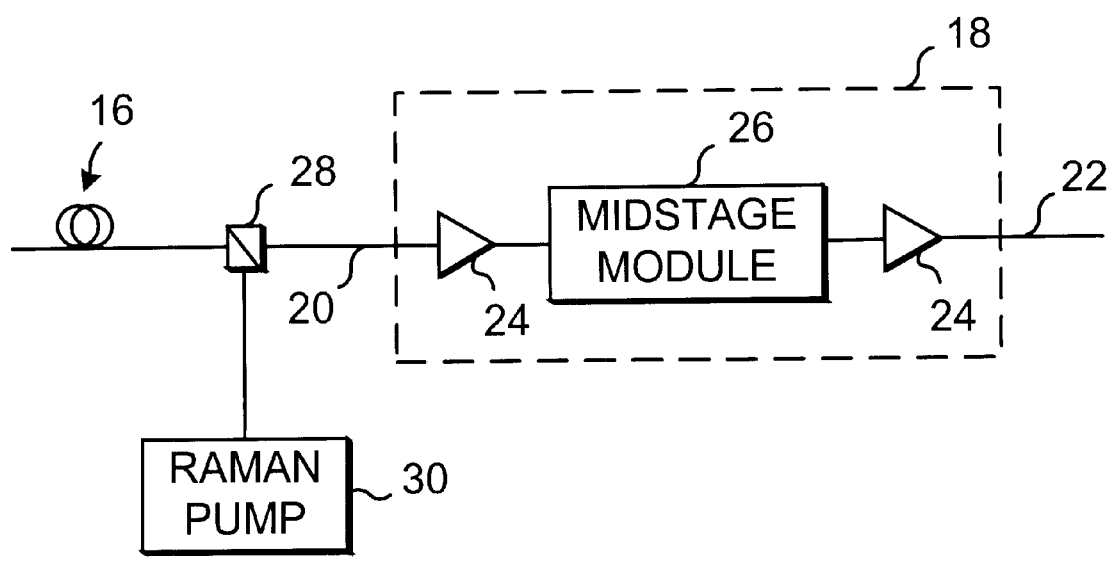
FIG. 2 is a schematic diagram of an illustrative optical amplifier and Raman pump equipment for providing distributed Raman amplification in a transmission fiber span in accordance with the present invention.

Optical amplifiers 18 may be used to amplify optical signals between successive spans of fiber 16. An illustrative amplifier 18 is shown in FIG. 2. Input signals from a preceding span of transmission fiber 16 may provided to input fiber 20. Corresponding output signals that have been amplified by amplifier 18 may be provided at fiber output 22. Amplifier 18 may have one, two, or more gain stages such as gain stages 24.

Gain stages 24 may be based on erbium-doped amplifier stages or other rare-earth-doped fiber amplifier stages, may be based on semiconductor optical amplifier stages, may be based on discrete Raman amplifier stages, may be based on other suitable amplifier stages, or may be based on combinations of such stages. For clarity, the present invention will be described primarily in the context of rare-earth-doped fiber gain stages and Raman gain stages.

Amplifier 18 may also have a midstage module 26. If desired, midstage module 26 may be removable. Connectors such as FC/APC connectors or other suitable connectors may be provided on the input and output fibers of module 26 to facilitate the replacement or swapping of modules. Midstage modules 26 may include dispersion-compensation modules such as a dispersion-compensation modules based on coils of dispersion-compensating fiber (which may or may not be optically pumped to produce Raman gain), gain equalization filter modules, modules containing variable optical attenuators or short lengths of single mode fiber, or any other suitable midstage components.

As shown in FIG. 2, amplifiers 18 may be used in configurations in which Raman pump light is launched into transmission fiber spans 16. In the example of FIG. 2, Raman pump 30 is shown as being used to supply pump light for span 16. Pump light may be coupled into span 16 in the backwards direction using pump coupler 28. Pump coupler 28 may be wavelength-division multiplexing (WDM) couplers or any other suitable pump couplers. If desired, a pump coupling arrangement based on circulators may be used.

Raman pump 30 may include one or more Raman pump sources such as lasers or other optical sources operating at one or more wavelengths. For example, Raman pump 30 may include diode lasers operating at one or more wavelengths.

A single wavelength may be used when complexity and cost are important. Multiple pump wavelengths may be used when a wide gain spectrum is desired. In equipment with multiple pump wavelengths, any suitable number of pump wavelengths may be used. For example, two, three, four, five, . . . ten, or more pump wavelengths may be used. The Raman pump arrangement of FIG. 2 is a counterpumping arrangement. If desired, a copumping arrangement may be used.

Figure 3:
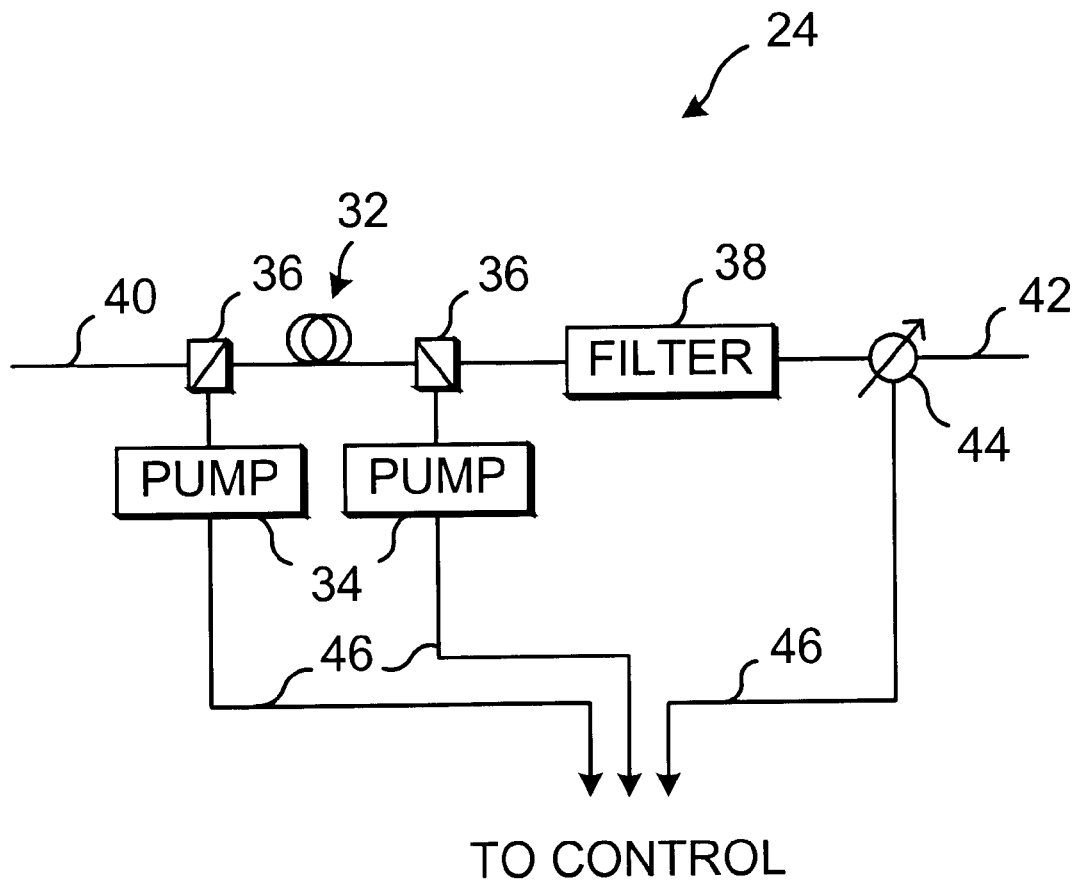
FIG. 3 is a schematic diagram of an illustrative gain stage for an amplifier in accordance with the present invention.

A schematic diagram of an illustrative gain stage 24 in which gain is provided by an optically pumped fiber 32 is shown in FIG. 3. Optical input signals that are provided to fiber input 40 are amplified by fiber 32 and corresponding output signals are provided at fiber output 42. Fiber 32 may be rare-earth-doped fiber such as a coil of erbium-doped fiber or may be fiber such as dispersion-compensating fiber, other small-core-area fiber, or other suitable fiber that is optically pumped to produce Raman gain through stimulated Raman scattering.

Fiber 32 may be optically pumped by pumps 34. If fiber 32 is erbium-doped fiber, for example, pumps 34 may be diode laser pumps operating at wavelengths of 980 nm or 1480 nm or other suitable wavelengths. Pump light from pumps 34 may be coupled into fiber 32 using pump couplers 36. Pump couplers 36 may be wavelength-division-multiplexing couplers, couplers based on circulators, or any other suitable pump couplers. The pumping arrangement shown in FIG. 3 uses both counterpumping and copumping. If desired, fiber such as fiber 32 may be only counterpumped or only copumped.

Filter 38 may be a static spectral filter for modifying the gain spectrum of fiber 32 and for shaping the gain spectrum of any amplifier 18 in which gain stage 24 is used. Variable optical attenuator 44 may be adjusted to produce different amounts of attenuation. If gain stage 24 is being used as a power amplifier stage, components such as filter 38 and attenuator 44 may be omitted. Moreover, gain stages and amplifiers may have other components such as isolators, taps, wavelength-division-multiplexing couplers, static and dynamic filters, optical channel monitors, or other suitable components.

The power of the pump light produced by pumps 34 may be controlled using paths 46. The settings of variable optical attenuator 44 may also be controlled using a path 46.

Figure 4:
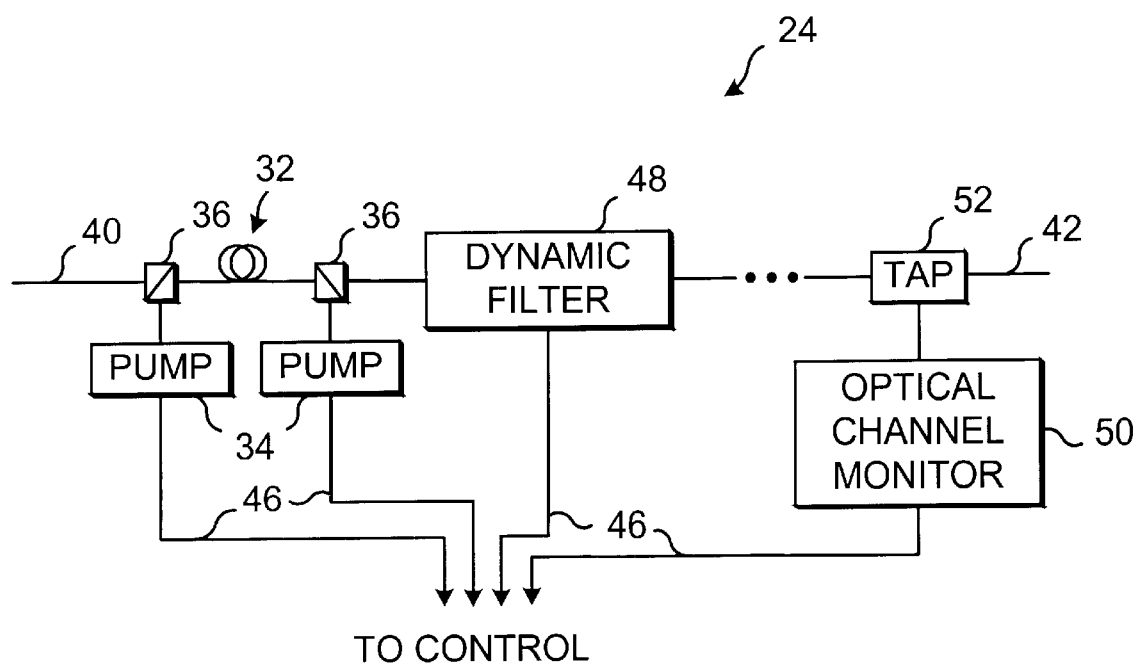
FIG. 4 is a schematic diagram of another illustrative gain stage for an amplifier in accordance with the present invention.

An illustrative gain stage 24 having a dynamic filter 48 is shown in FIG. 4. Dynamic filter 48 may have a controllable transmission spectrum. By controlling the spectrum produced by filter 48, the gain spectrum of stage 24 and the amplifier 18 in which stage 24 is used may be controlled as desired. A dynamic filter such as dynamic filter 48 may be located between coils of fiber 32 to minimize the noise figure impact associated with the insertion loss of filter 48.

The amplifier 18 in which filter 48 is used may have an internal optical channel monitor 50 or may receive spectral information from an external optical channel monitor. Optical channel monitor 50 may be used to measure the spectrum of the signals traveling through gain stage 24 and the amplifier 18 in which gain stage 24 is used. Tap 52 may be used to tap these signals from the main fiber path through stage 24. Fiber 53 may be used to provide the tapped signals from tap 52 to optical channel monitor 50.

Information on the optical spectrum of the tapped signals measured by optical channel monitor 50 may be provided to a control unit in amplifier 18 using a path 46. Dynamic filter 48 may also be controlled over a path 46.

Amplifier 18 may use any suitable gain stages 24 such as the gain stages of FIGS. 3 and 4, gain stages that have only optically-pumped fiber 32 and no filters or attenuators, or any other suitable combinations of gain media and components.

Figure 5:
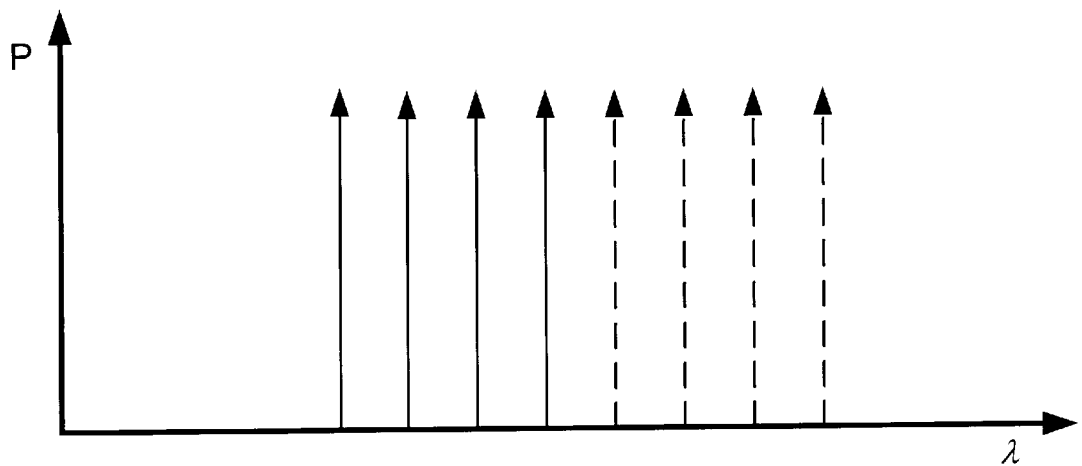
FIG. 5 is a graph showing the channels of a wavelength-division-multiplexing communications link in accordance with the present invention.

Gain transients may arise in gain stages 24 if the pump power produced by pumps 30 is not adjusted in response to fluctuations in signal loading conditions. An illustrative graph of the channels in a wavelength-division-multiplexing system is shown in FIG. 5. In a typical channel drop event, the channels represented by the dotted lines may be suddenly dropped from a communications link due to a system reconfiguration or an accidental fiber cut. These channels may then be abruptly restored.

Figure 6:
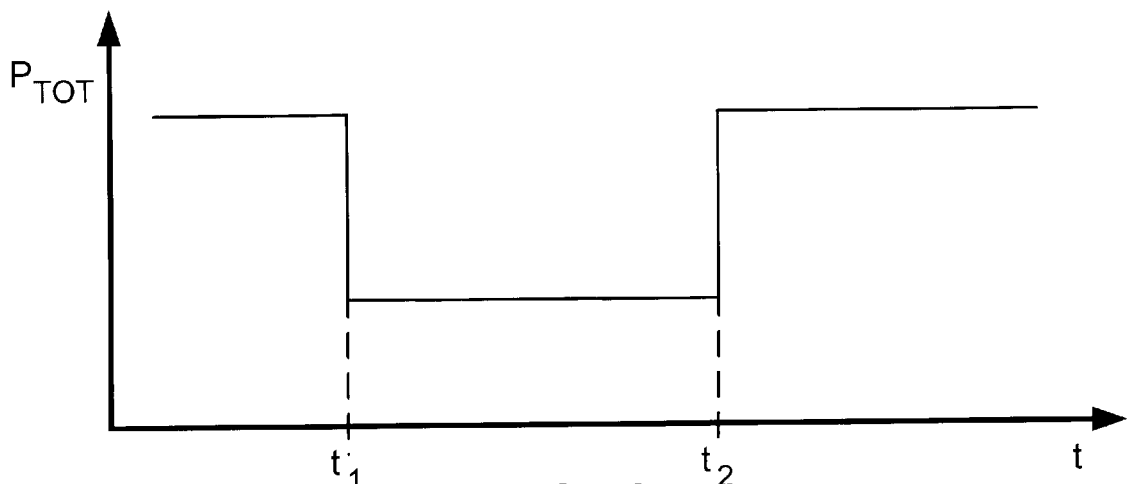
FIG. 6 is a graph showing how the total input power to an amplifier may change suddenly due to fluctuations in the number of channels being carried on a communications link.

As a result, the total data signal input power to amplifier 18 may fluctuate as shown in FIG. 6.

Figure 7:
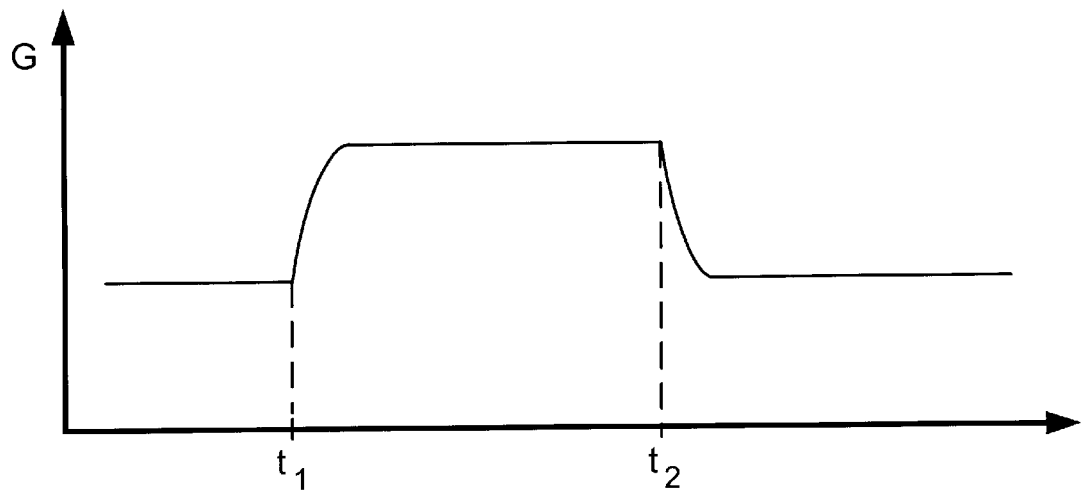
FIG. 7 is a graph showing how the gain of an optical amplifier without transient control capabilities may exhibit gain transients when subjected to input power fluctuations of the type shown in FIG. 6.

When gain stages 24 are based on, for example, rare-earth-doped fiber coils such as erbium-doped fiber coils, input power fluctuations of the type shown in FIG. 6 may produce gain fluctuations in gain stages 24 of the type shown in FIG. 7, unless a transient control scheme is used. Raman amplifiers and other amplifiers may also suffer from gain transients.

Figure 8:
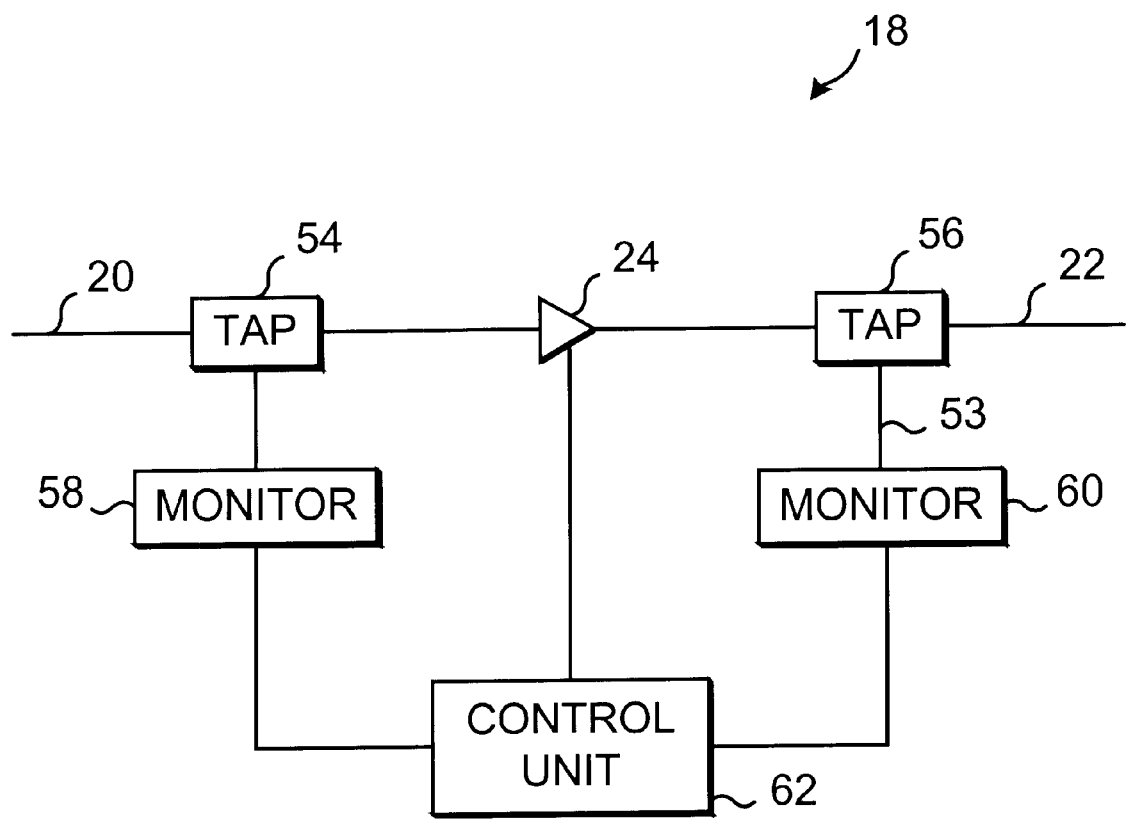
FIG. 8 is a schematic diagram of an illustrative optical amplifier having input and output optical monitors for monitoring signals powers in the amplifier in accordance with the present invention.

An illustrative arrangement that may be used to suppress gain transients is shown in FIG. 8. The amplifier 18 of FIG. 8 has only one gain stage. This is merely illustrative. Amplifier 18 may have any suitable number of gain stages.

Input and output taps 54 and 56 may be used to tap optical signals at the input and output of amplifier 18 and gain stage 24. Respective optical monitors 58 and 60 may be used to convert the tapped optical signals from taps 54 and 56 into electrical signals for processing by control unit 62. Control unit 62 may be based on any suitable control electronics and may include one or more microprocessors, microcontrollers, digital signal processors, programmable logic devices, application-specific integrated circuits, digital-to-analog converters, memory devices, etc.

The input tap 54 and optical monitor 58 may be used to detect input power fluctuations. The output tap 54 and optical monitor 60 may be used to measure the output power of amplifier 18. The total average gain of stage 24 may be measured by determining the ratio of the output power measured with monitor 60 to the input power measured with monitor 58.

If desired, control unit 62 may use feedback to maintain the gain of stage 24 at a constant level. A gain error parameter E may be defined using equation 1, where $G_{DESIRED}$ is the desired gain for stage 24 and $G_{MEASURED}$ is the gain measured using monitors 58 and 60.

$$E = G_{DESIRED} - G_{MEASURED} \quad (1)$$

A feedback contribution to the pump power $P_{PUMP-FB}$ may then be calculated using the relationship of equation 2.

$$P_{PUMP-FB} = \alpha E + \beta \int E + \gamma E' \quad (2)$$

In equation 2, $\alpha$, $\beta$, and $\gamma$ are fitting parameters that may be determined experimentally. Equation 2 is based on the proportional-integral-derivative (PID) technique. If desired, other suitable feedback techniques may be used.

The feedback signal E lags the change in input power, as shown by the input power graph of FIG. 6 and the gain graph of 7. Accordingly, it may be desirable to use a feed-forward contribution to the pump power adjustment. The input power PIN to stage 24 of FIG. 8 may be measured using tap 54 and monitor 58. A feed-forward pump power contribution $P_{PUMP-FF}$ may be calculated using the linear approximation of equation 3 or any other suitable functional relationship.

$$P_{PUMP-FF} = aP_{IN} + b \quad (3)$$

Control unit 62 may control the pump power produced by the pump or pumps in gain stage 24 according to the relationship of equation 4 or other suitable relationship that involves both feed-forward and feedback contributions.

$$P_{PUMP} = P_{PUMP-FF} + P_{PUMP-FB} \quad (4)$$

Pump power control schemes may also be used that only involve feed-forward signals or that only use feedback signals.

If an amplifier 18 has multiple gain stages 24, each gain stage 24 may be provided with a separate input and output tap and associated set of optical monitors. The control unit 62 may control each of the gain stages in parallel using a control scheme such as a control scheme based on equation 4. Another suitable approach involves using an input tap before the input to the first stage and an output tap after the last stage. The pump powers of one or some or all of the gain stages may be controlled (e.g., using the relationship of equation 4) in response to the signals measured with the input and output monitors.

If desired, input and output monitors such as monitors 58 and 60 may be provided with spectral filters that modify the spectrum of the tapped light that is measured. This may improve the accuracy of the transient control scheme by compensating for non-flat gain media spectra and non-flat overall gain spectra between the input and output taps.

There is typically a finite delay associated with using control unit 62 to measure and process signals from the optical monitors. For example, there may be a delay of 100 ns or more, even if relatively fast electronics are used in control unit 62. During this delay, the gain of the amplifier may suffer from transient effects, before such transient effects are fully suppressed.

Figure 9:
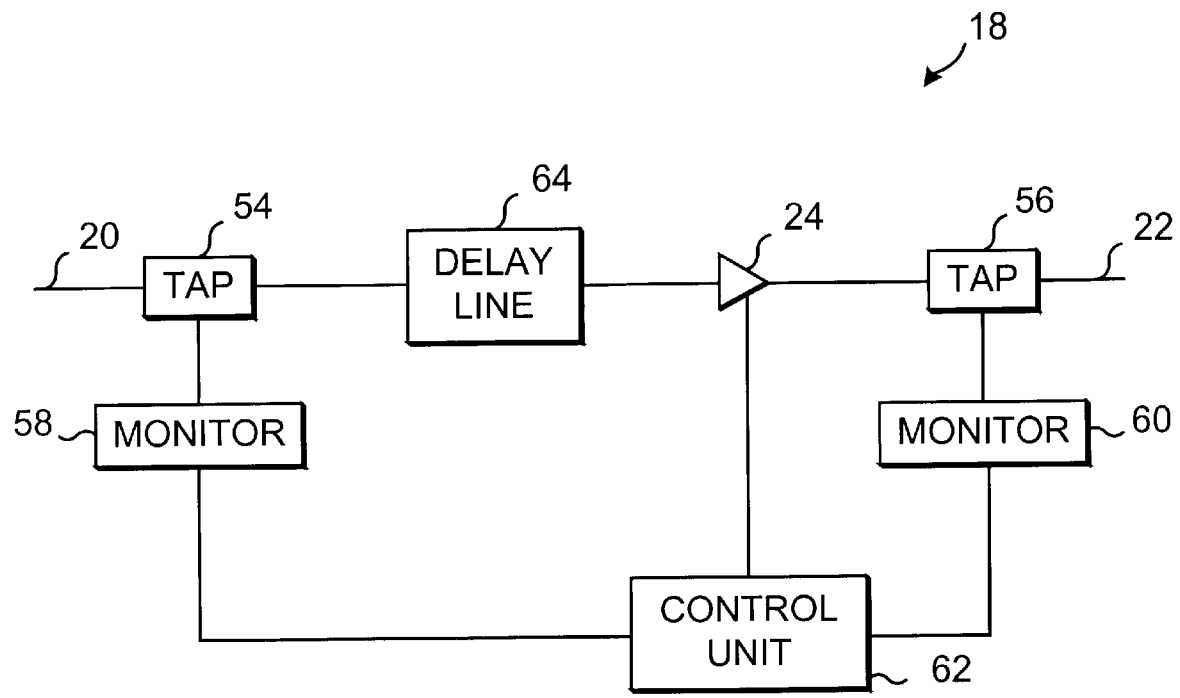
FIG. 9 is a schematic diagram of an illustrative optical amplifier having an optical delay line between an input tap and a gain stage in accordance with the present invention.

As shown in FIG. 9, amplifier 18 may be provided with an optical delay line 64. Delay line 64 may be based on a coil of single mode fiber or other suitable fiber. The length of the fiber in delay line 64 may be selected to be long enough to generate a delay in delay line 64 that is sufficient to allow the control unit 62 to process the signals from the optical monitors. For example, a delay of 1 μs to 2 μs may be created by a coil of approximately 200–400 m in length. This is merely an illustrative length. Any suitable length for generating the desired amount of delay for control unit 62 may be used.

Figure 10:
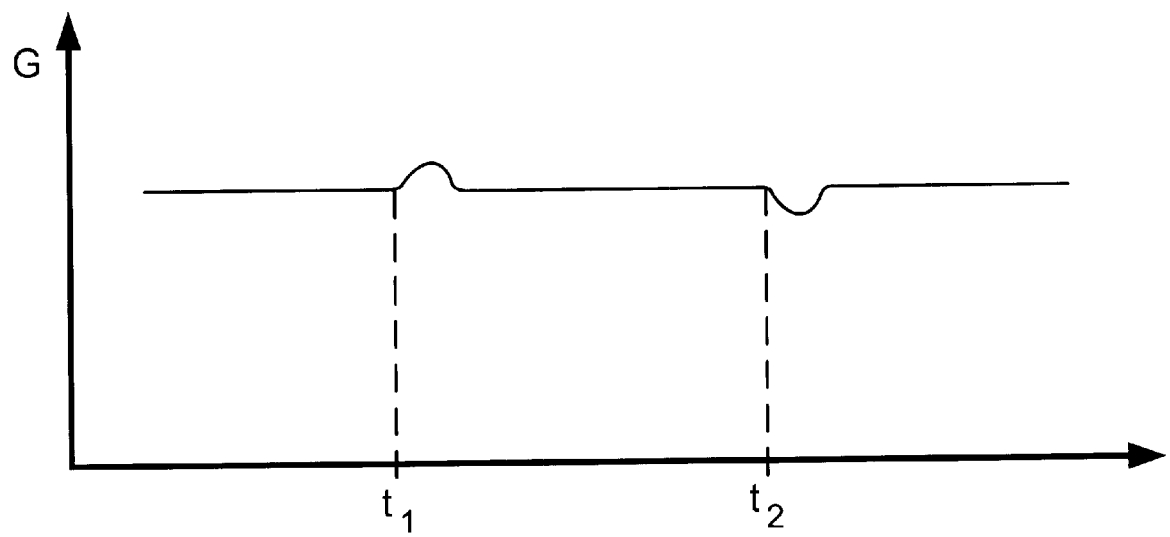
FIG. 10 is a graph showing how gain transients may be suppressed in an optical amplifier with transient control capabilities when subjected to input power fluctuations of the type shown in FIG. 6.

A graph of the gain of a typical amplifier 18 that uses the transient control scheme of FIG. 8 when subjected to input power fluctuations of the type shown in FIG. 6 is shown in FIG. 10. As shown in FIG. 10, there are typically small transient effects at times $t_1$ and $t_2$ (e.g., the times at which channels were added and dropped). The transient effects of FIG. 10 are significantly reduced from the transient effects shown in FIG. 7 for an amplifier without transient control capabilities.

Figure 11:
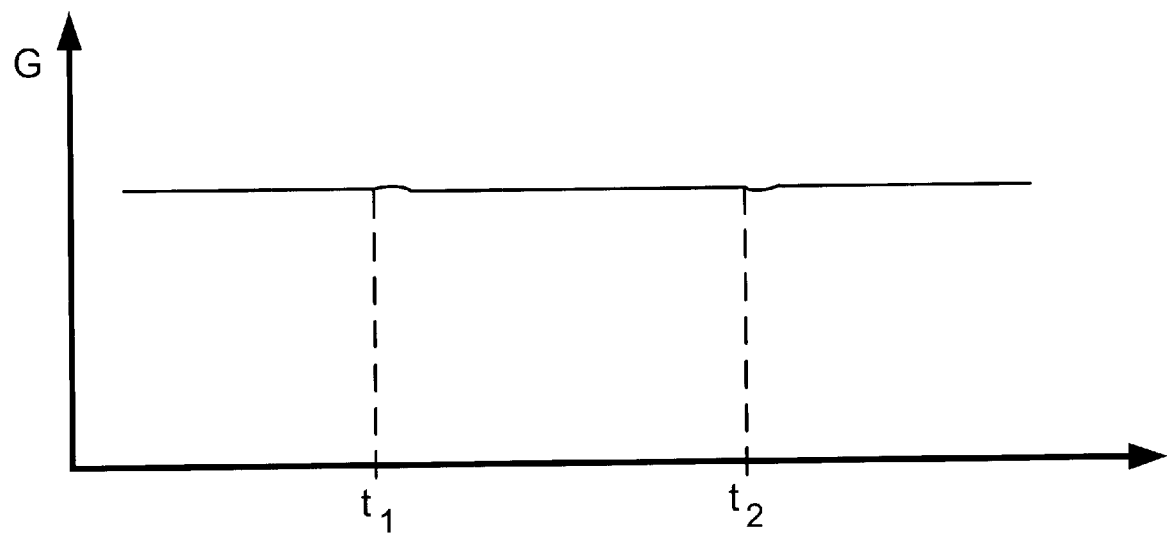
FIG. 11 is a graph showing how gain transients may be suppressed in an optical amplifier with transient control capabilities and an optical delay line when subjected to input power fluctuations of the type shown in FIG. 6.

A graph of the gain of an illustrative amplifier 18 that uses the delay line transient control scheme of FIG. 9 when subjected to input power fluctuations of the type shown in FIG. 6 is shown in FIG. 11. Because the delay line 64 provides control unit 62 with more time to process the tapped optical signals, control unit 62 can more fully suppress gain transients, as shown by the small magnitude of the gain transients of FIG. 11.

Delay line 64 may be placed at any suitable location in the optical path of amplifier 18. In the example of FIG. 9, delay line 64 is shown as being placed before the input to gain stage 24. If desired, a delay line such as delay line 64 may be fully or partially incorporated into the rare-earth-doped or Raman-pumped fiber of gain stage 24. Moreover, if multiple gain stages 24 are used, delay line 64 may be placed at a somewhat less forward location than at the first input of amplifier 18. If this approach is used, the first gain stage 24 may be pumped sufficiently to operated in or close to a linear (non-saturated) regime to reduced the effects of gain transients.

Figure 12:
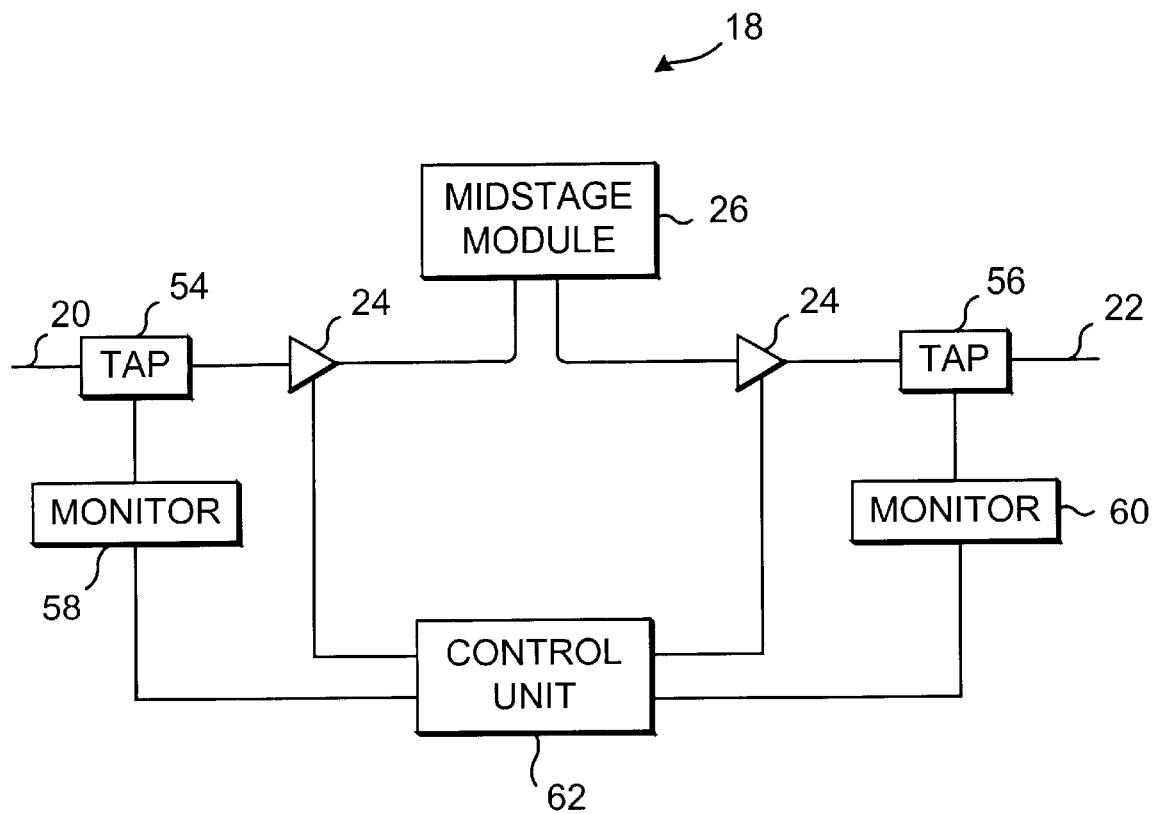
FIG. 12 is a schematic diagram of an illustrative optical amplifier having a midstage module and optical taps for supporting transient control functions in accordance with the present invention.

An illustrative amplifier 18 into which a midstage module 26 has been installed is shown in FIG. 12. The midstage module 26 that is used may change from time to time based on the requirements of the system. For example, the midstage module 26 used for one amplifier 18 might include a spool of dispersion-compensating fiber of 10 km in length, the midstage module 26 used for another amplifier 18 may include a spool of dispersion-compensating fiber that is 20 km in length. Because the length of the dispersion-compensating fiber that is placed in the midstage of a given amplifier 18 may not be known until field installation of the amplifier or module, the optical delay time associated with the module 26 that is used may also not be known until the time of field installation.

One way in which to control gain transients in amplifier 18 involves controlling transients in the first gain stage 24 with an arrangement of the type shown in FIG. 8 or FIG. 9 while independently controlling transients in the second gain stage 24 with the same type of arrangement. Any suitable number of gain stages may be controlled in this way, which avoids the impact of the different time delays associated with using different modules 26.

Another way in which to control gain transients in an amplifier 18 of the type shown in FIG. 12 involves using components in amplifier 18 to automatically detect which type of module 26 has been installed in the amplifier. This may be accomplished by determining the delay time associated with the particular module 26 that has been installed.

With one suitable approach, control unit 62 may modulate the gain of the first gain stage 24 by modulating the pump power produced in that gain stage. The gain modulation in turn modulates the wavelength-division-multiplexing data signals on the data channels being amplified by amplifier 18. The depth of the gain modulation may be kept small (e.g., a few percent) to avoid interfering with the normal data traffic being carried on the data channels. Control unit 62 may measure the modulation of the data signals using tap 56 and monitor 60. Control unit 62 may then process the received signals to determine the delay associated with module 26.

Figure 13:
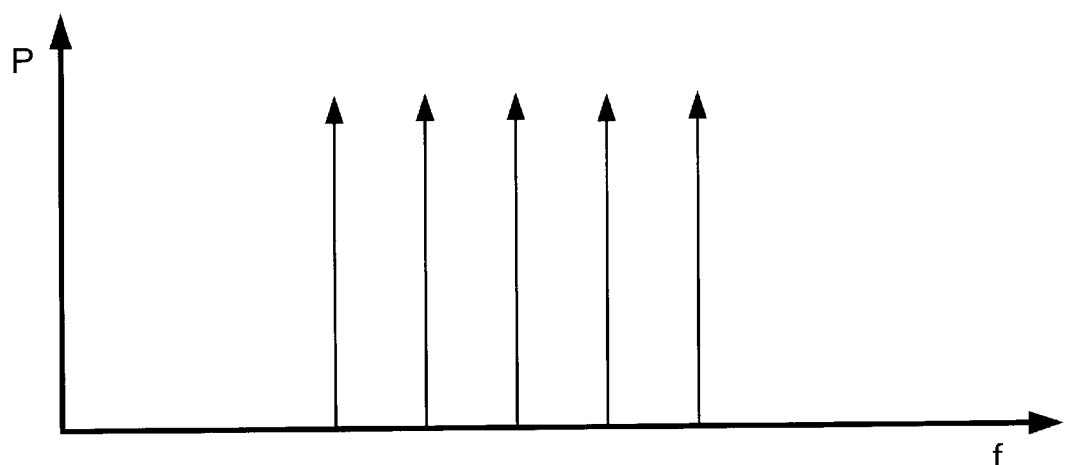
FIG. 13 is a graph showing illustrative signal tones that may be used to modulate the gain of the first stage of an amplifier such as the amplifier of FIG. 12.

The pump power of the first gain stage 24 may be modulated with a signal that is a combination of multiple sinusoidal tones with different frequencies or other suitable signals having frequencies in the kilohertz range or other suitable frequency range. A graph showing the frequency spacing of an illustrative set of modulating tones is shown in FIG. 13.

Figure 14:
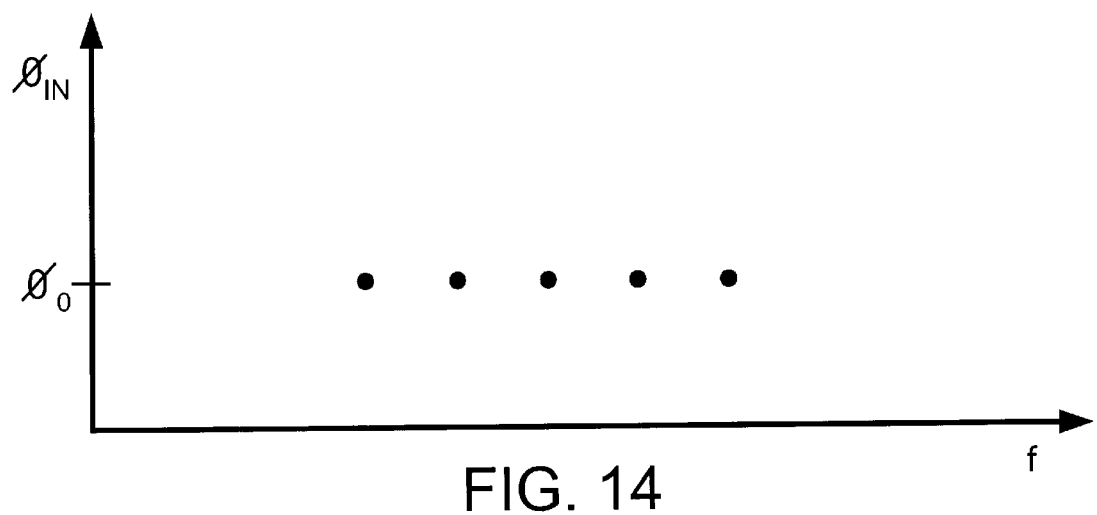
FIG. 14 is a graph showing how the illustrative signal tones may have the same phase before propagating through a midstage module in accordance with the present invention.
Figure 15:
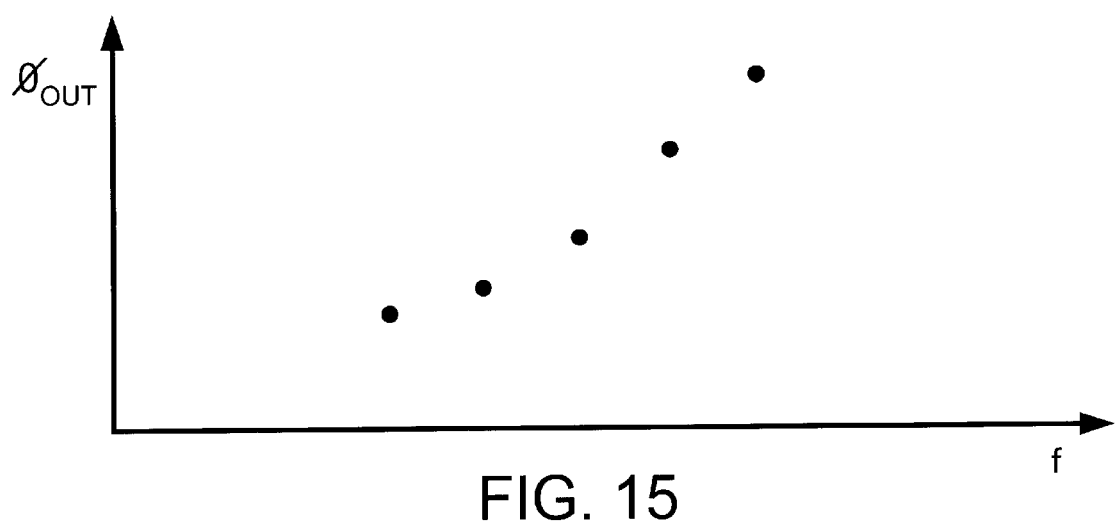
FIG. 15 is a graph showing how the phases of the illustrative signal tones may be shifted relative to one another after passing through a midstage module in accordance with the present invention.

As shown in FIG. 14, the relative phases between the modulating signals may be controlled. Any fixed relationship may be used. In the example of FIG. 14, all tones initially have the same phase ($\Phi_0$). As the modulated data signals travel through the dispersion-compensating fiber in module 26, the phase relationship between the signals changes in proportion to the frequency of the signals, as shown in the illustrative graph of FIG. 15.

The changes in the relative phases of the different modulating signals is a function of the length of the dispersion-compensating fiber. If the fiber length is nearly zero, there will be no significant shift in phases. If the fiber length is long, the phases may be shifted significantly with respect to each other. Control unit 62 may use Fourier analysis techniques or other suitable signal analysis techniques to compute the delay time associated with the module 26 that has been installed in amplifier 18 based on the measured phases of the detected modulation signals. This information may then be used in subsequent transient control operations.

In particular, a midstage module 26 based on dispersion-compensating fiber or other elements that create an optical delay may be treated as a delay line such as delay line 64 of FIG. 9. Control unit 62 may use information on the delay associated with module 26 to ensure that any pump power adjustments that are made to the second gain stage and any subsequent gain stages to suppress gain transients are not made too early or too late. If desired, the dispersion-compensating fiber in module 26 may be Raman pumped to reduce the insertion loss associated with the dispersion-compensating fiber.

The delay times associated with modules 26 based on coils of dispersion-compensating fiber are typically significantly larger than the delays associated with delay lines such as delay line 64 of FIG. 9. As a result, control unit 62 may introduce its own delay to accommodate the long delay of module 26 and maintain synchronization between the pump adjustments made in the second gain stage with the power measurements made using input tap 54. If desired, control unit 62 may also introduce delays when delay line 64 introduces more delay than necessary to accommodate the minimum electronic delays associated with processing in control unit 62. When multiple modules 26 or delay lines 64 are used in an amplifier 18, control unit 62 may coordinate pump power adjustments to accommodate multiple associated delays.

Figure 16:
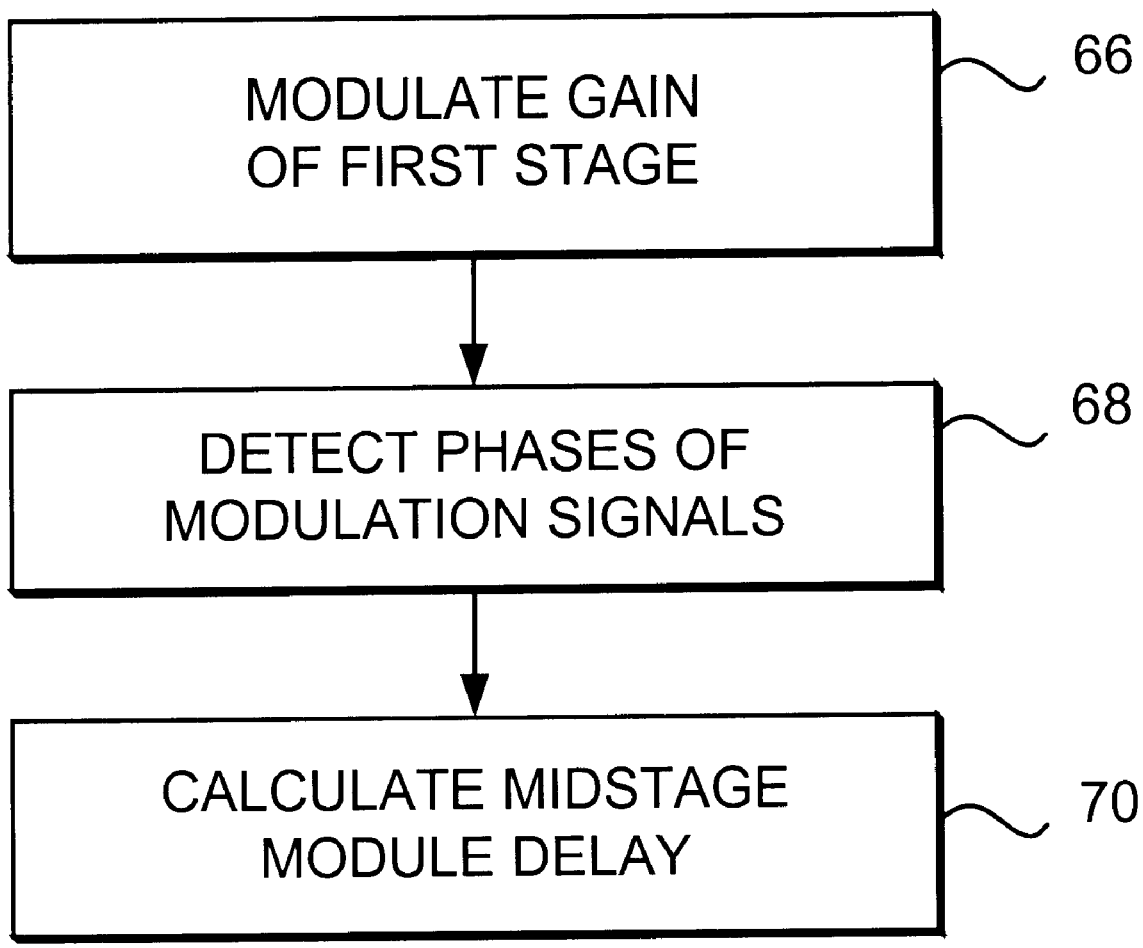
FIG. 16 is a flow chart of illustrative steps involved in measuring the delay associated with a given midstage module in accordance with the present invention.

Illustrative steps involved in using an amplifier arrangement of the type shown in FIG. 12 to measure the delay time associated with midstage module 26 are shown in FIG. 16. At step 66, control unit 62 may modulate the gain of the first stage by modulating the pump power produced by the pump or pumps in the first gain stage 24. The first gain stage 24 may contain one or more coils or rare-earth-doped fiber or other suitable gain media.

Modulating the gain of the first gain stage 24 modulates the optical data signals (e.g., the optical signals on the wavelength-division-multiplexing channels on link 10) as these signals pass along the main fiber path in amplifier 18 between input 20 and output 22. The gain may be modulated using any suitable modulating signals such as sine wave signals at frequencies in the kilohertz range. If gain stages 24 include rare-earth-doped fiber such as erbium-doped fiber, using frequencies in the kilohertz range allows the inversion level in the pumped fiber to respond properly as the pump power is modulated. Moreover, the periods of the kilohertz-frequency modulating sine wave signal tone components may be comparable to the delay times associated with the midstage module 26. This may help to allow the phase relationships between the different tone components in the modulating signal to be measured.

If midstage module 26 includes a significant length of dispersion-compensating fiber or other components that create optical delay, the phases of the modulating tones or signals will become shifted with respect to each other due to the delay. At step 68, the phases of the modulation signals may be detected. Control unit 62 may detect the phases of the modulation signals after midstage module 26 using tap 56 and monitor 60. Information on the relative phases of the modulation signals detected at tap 56 may be extracted from the signals using Fourier analysis or other suitable analysis techniques. These techniques or other suitable techniques may also be used in calculating the delay time associated with module 26 based on the phase information at step 70. The delay of module 26 may be used to allow control unit 62 to have sufficient time to process signals from taps such as tap 54 that are located before module 26 when controlling the gain of gain stages 24 that are located after the module 26 such as the second gain stage in FIG. 12.

Figure 17:
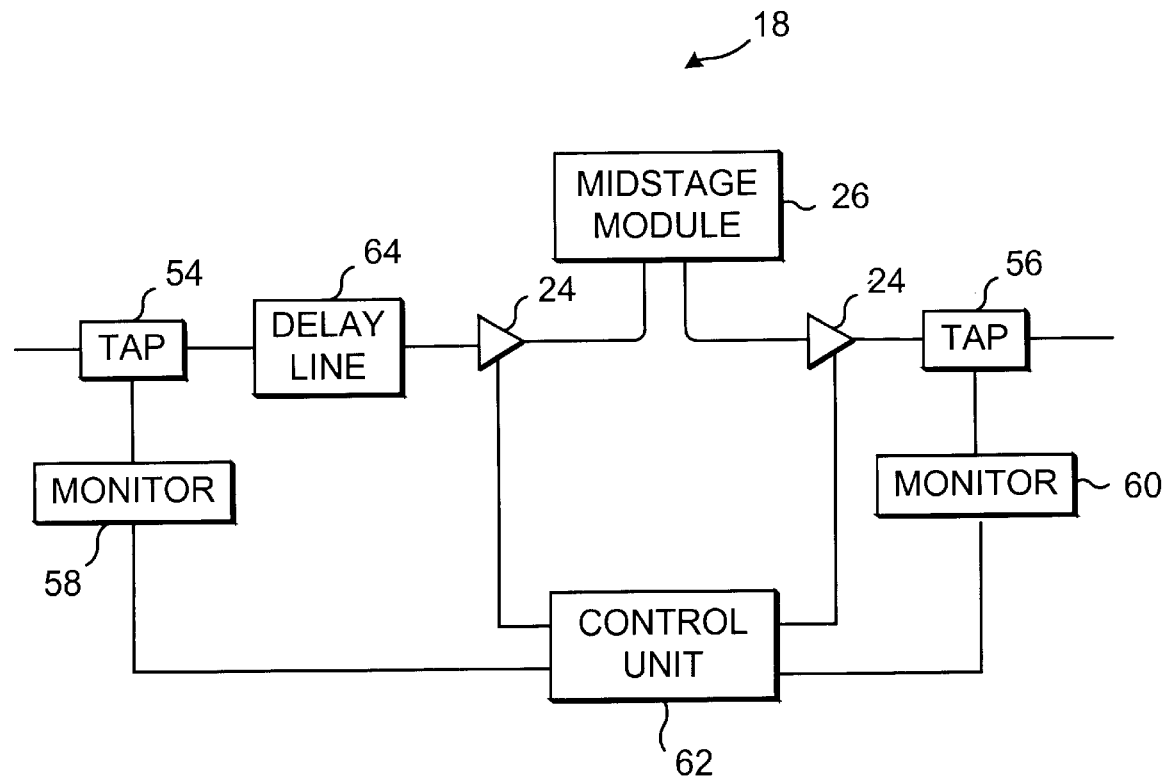
FIG. 17 is a schematic diagram of an illustrative optical amplifier with a midstage module and an optical delay line in accordance with the present invention.

An amplifier 18 with a midstage module 26 (e.g., a midstage module based on dispersion-compensating fiber or other components that contribute a delay) and having a delay line 64 for the first gain stage 24 is shown in FIG. 17. With this type of configuration, delay line 64 provides control unit 62 with sufficient time to process the signals from tap 54 or other location before delay line 64 when adjusting the pump power in the first gain stage 24. The delay associated with midstage module 26 provides additional delay which may be significant (e.g., on the order of tens of microseconds or more). This delay also helps to provide control unit 62 with sufficient time to process tapped optical signals (e.g., tapped input signals) from taps located before module 26 such as tap 54. Because of the significant length of the delay of midstage module 26, it may be necessary for control unit 62 to delay in adjusting the pump power in the gain stages 24 after module 26 such as the second gain stage 24 in FIG. 17. This ensures that the pump power adjustments to these gain stages are not made too early.

Figure 18:
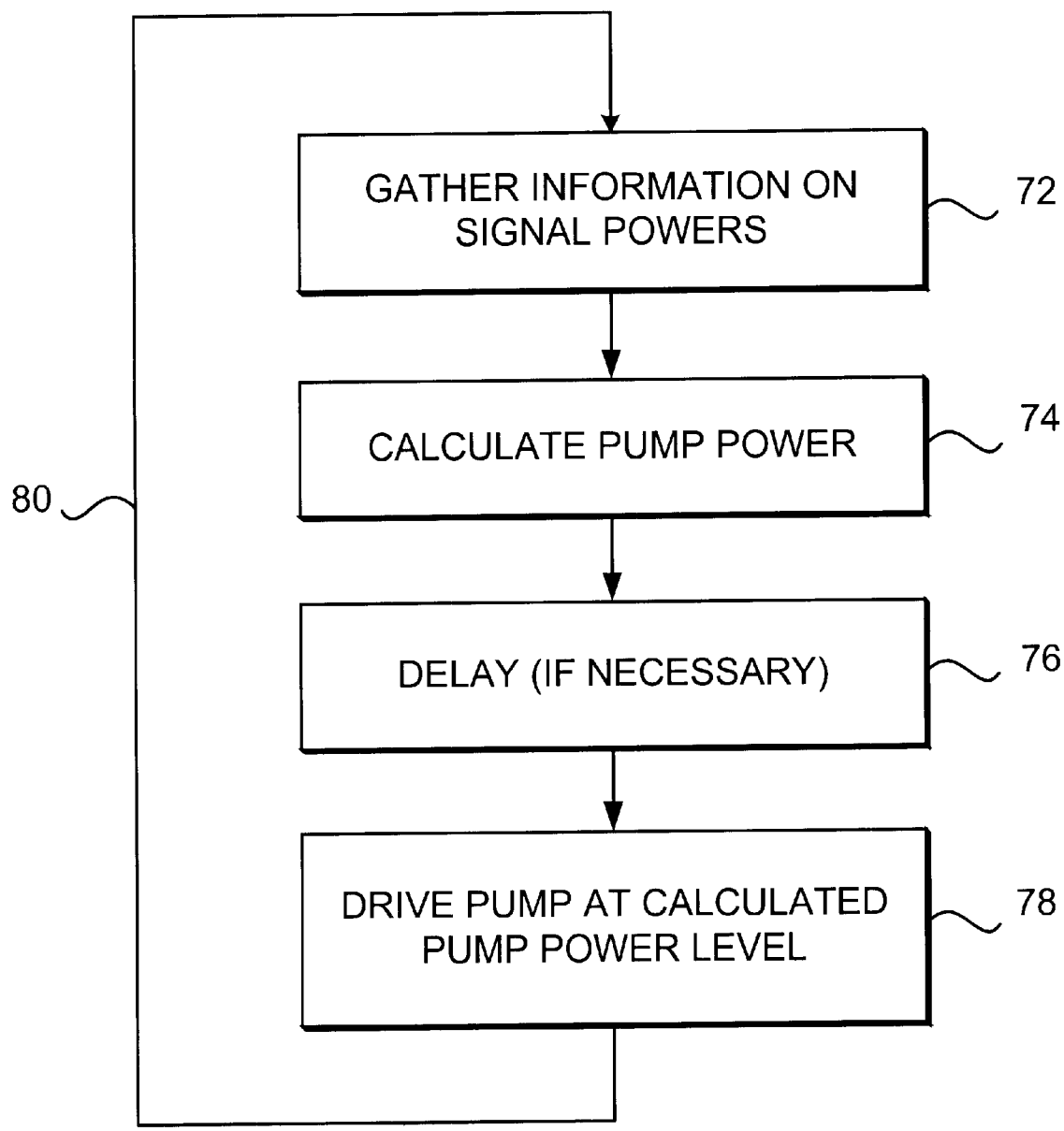
FIG. 18 is a flow chart of illustrative steps involved in controlling an optical amplifier to suppress gain transients in accordance with the present invention.

Illustrative steps that may be used to control gain transients in amplifiers 18 that have one or more delay lines or modules 26 or other components with associated optical delays are shown in FIG. 18. At step 72, control unit 62 may use taps and monitors to gather information on signal powers in amplifier 18. Signal power information may be gathered in the main fiber path of amplifier 18 at a location or locations that come before and after the delay elements.

At step 74, control unit 62 may calculate the pump power or powers that should be used to pump the appropriate gain stages 24.

At step 76, control unit 62 may create electronic delay if this is needed to synchronize the pump power adjustments that are to be made with the expected appearance of gain transients. For example, if delay line 64 creates a delay that is slightly longer than the electronic processing delays associated with control unit 62, control unit 62 may create a small electronic delay to ensure that the pump power adjustments that are made by control unit 62 based on input power measurements with tap 54 and monitor 58 are made at the proper time. If a midstage module creates a significant delay between the location at which the signal powers are measured and the gain stage being adjusted, control unit 62 may introduce a fairly substantial electronic delay at step 76 to ensure that pump powers are controlled appropriately.

At step 78, the pump or pumps in the appropriate gain stages 24 may be driven at the calculated pump power level or levels using an approach such as the approaches described in connection with equations 1–4. As shown by line 80, the steps of FIG. 18 may be performed in a loop. If desired, independent control loops for the first and second gain stages or other suitable gain stages may be operated simultaneously in parallel.

It will be understood that the foregoing is merely illustrative of the principles of this invention, and that various modifications can be made by those skilled in the art without departing from the scope and spirit of the invention.

What is claimed is:

1. Optical amplifier equipment that amplifies optical signals in a fiber in a communications network, comprising:
    first and second gain stages that each have fiber and at least one pump that optically pumps the fiber at a pump power to produce optical gain for the optical signals;
    a midstage module located between the first and second gain stages, wherein the midstage module includes dispersion-compensating fiber that creates an optical delay for the optical signals passing from the first gain stage to the second gain stage;
    first and second optical monitors that measure the optical signals in the optical amplifier equipment, wherein the first optical monitor is located in the optical amplifier equipment at a location that is before the midstage module and wherein the second optical monitor is located in the optical amplifier equipment at a location that is after the midstage module; and
    a control unit that modulates the gain of the first gain stage by modulating the pump power in the first gain stage, that measures a resulting modulation of the optical signals using the second optical monitor, and that uses these measurements to determine the magnitude of the optical delay associated with the midstage module, wherein the control unit uses information on the magnitude of the optical delay and the measured optical signals in the optical amplifier equipment to control the pump power of the second stage to suppress gain transients.

2. The optical amplifier equipment defined in claim 1 wherein the control unit introduces a delay corresponding to the measured optical delay associated with the midstage module during the suppression of gain transients.

3. The optical amplifier equipment defined in claim 1 further comprising an optical delay line that delays the optical signals before the optical signals are provided to the first gain stage.

4. The optical amplifier equipment defined in claim 1 further comprising an optical delay line that delays the optical signals before the optical signals are provided to the first gain stage, wherein the first optical monitor measures the optical signals before the optical delay line and wherein the delay associated with the delay line ensures that there is sufficient time for the control unit to process the measured optical signals from the first optical monitor before making pump power adjustments to the pump in the first gain stage to suppress gain transients.

5. The optical amplifier equipment defined in claim 1 wherein the fiber in the first and second gain stages comprises rare-earth-doped fiber and wherein the pumps in the first and second gain stages include laser diodes.

6. The optical amplifier equipment defined in claim 1 wherein the first and second optical monitors receive signals from a main fiber path through the optical amplifier equipment using taps.

7. The optical amplifier equipment defined in claim 1 wherein the control unit uses input power measurements and output power measurements made using the first and second optical monitors to control the pump powers to suppress gain transients.

8. The optical amplifier equipment defined in claim 1 wherein the control unit uses input power measurements and output power measurements made using the first and second optical monitors to control the pump powers to suppress gain transients using feed-forward and feedback control techniques.

9. The optical amplifier equipment defined in claim 1 further comprising a dynamic spectral filter between the first and second gain stages that is controlled by the control unit.

10. The optical amplifier equipment defined in claim 1 further comprising:
 a dynamic filter that modifies the spectrum of the optical signals; and
 an optical channel monitor that measures the spectrum of the spectrally-modified optical signals.

11. The optical amplifier equipment defined in claim 1 wherein the fiber is pumped by the pumps to produce the optical gain by stimulated Raman scattering.

12. Optical amplifier equipment that amplifies optical signals in a fiber in a communications network, comprising:
 first and second gain stages that each have fiber and at least one pump that optically pumps the fiber at a pump power to produce optical gain for the optical signals;
 a midstage module located between the first and second gain stages, wherein the midstage module includes dispersion-compensating fiber that creates an optical delay for the optical signals passing from the first gain stage to the second gain stage;
 first and second optical monitors that measure the optical signals in the optical amplifier equipment at respective locations that are located before and after the midstage module; and
 a control unit that uses information on the magnitude of the optical delay and the measured optical signals in the optical amplifier equipment to control the pump power of the second stage to suppress gain transients.

13. The optical amplifier equipment defined in claim 12 further comprising an optical delay line between the first optical monitor and the first gain stage.

14. The optical amplifier equipment defined in claim 12 wherein the control unit is configured to use measurements from the first optical monitor to determine a feed-forward pump power.

15. Optical amplifier equipment that amplifies optical signals in a fiber in a communications network, comprising:
 first and second gain stages that each have fiber and at least one pump that optically pumps the fiber at a pump power to produce optical gain for the optical signals;
 first and second optical monitors located respectively before and after the first gain stage for measuring the optical gain of the first gain stage;
 third and fourth optical monitors located respectively before and after the second gain stage for measuring the optical gain of the second gain stage; and
 a control unit that uses information on the measured gains of the first and second gain stages and information on the input powers to the first and second gain stages to control the pump powers of the first and second gain stages to suppress gain transients.

16. The optical amplifier equipment defined in claim 15 further comprising an optical delay line between the first optical monitor and the first gain stage.

17. The optical amplifier equipment defined in claim 15 wherein the control unit is configured to use measurements from the first optical monitor to determine a feed-forward pump power for the first gain stage.

* * * * *